May 8, 1962

F. SPENCER ETAL 3,033,621

ROLLER JOURNALS FOR ROLLER MILLS

Filed Jan. 3, 1961

May 8, 1962  F. SPENCER ETAL  3,033,621
ROLLER JOURNALS FOR ROLLER MILLS
Filed Jan. 3, 1961  3 Sheets-Sheet 3
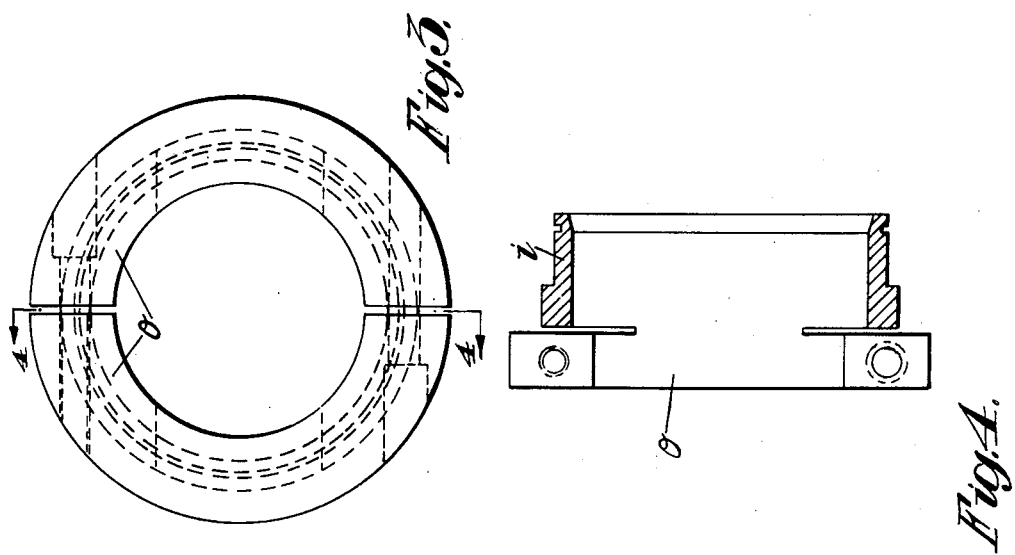

# United States Patent Office 3,033,621
Patented May 8, 1962

3,033,621
ROLLER JOURNALS FOR ROLLER MILLS
Frederick Spencer, Cheadle Heath, Stockport, and Reginald W. Jones, Sale, England, assignors to Henry Simon Limited, Stockport, and The Hoffmann Manufacturing Company Limited, Chelmsford, England, both British companies
Filed Jan. 3, 1961, Ser. No. 80,354
Claims priority, application Great Britain Jan. 11, 1960
2 Claims. (Cl. 308—207)

This invention relates to the journal bearings of the grinding rolls of roller mills which are used for the grinding of cereals, soap products and other materials wherein the uniformity of particle size of very small particles is of paramount importance, and is particularly directed to journal bearings of the anti-friction roller type wherein means are provided whereby during manufacture or subsequent reconditioning, the grinding roll shaft may be carried in machining journals in such a manner as to ensure that the finished grinding surface of the roll will be perfectly co-axial with the operational journal surfaces. The aforesaid journal bearing arrangement is subject to the disadvantage that endwise location of a grinding roll relative to the machine frame is controlled by means having seatings whose surfaces are prepared without reference to the operational journal surfaces, with the result that slight eccentricities affecting the relatively moving parts give rise to undue wear of the locating members, or alternatively, to a less positive location than is desirable.

The object of the present invention is to provide a journal bearing arrangement having the advantages of the known arrangement but which is free from the referred disadvantage.

According to the present invention, a grinding roll of a roller mill has its shaft carried at each end in a journal unit which comprises a bearing of the type in which two rows of rollers (each of which may be of the single or multiple row type) with their cages are retained in an outer race or races which space the rows of rollers apart, whilst the outer assembly (comprising the rollers and their cages, races and housing) is free to slide along a tubular inner race which is secured to the shaft and provides the roller tracks for both rows of rollers, one at least of said tubular inner races being characterized in that it is axially extended beyond the outer roller track to provide a perfectly co-axial seating surface to support an axially adjustable tubular carrier of the inner race of a deep-groove ball-bearing, whose outer race is in fixed axial association with the axially slidable assembly aforementioned, the said adjustable tubular carrier being fixable to the shaft to locate it axially in respect of the said slidable assembly, the same extension or extensions of the tubular inner race, together with that part of the inner race which is between the roller tracks, providing surfaces which are truly co-axial with the said roller tracks and can serve as journal surfaces in a machine tool when the outer assembly is not in position and the grinding surface of the roll is to be machined.

Referring to the accompanying explanatory drawings:

FIGURE 3 is an end view of the clamping ring shown in FIGURES 1 and 2,

FIGURE 4 is a sectional elevation on the line 4—4 of FIGURE 3.

In the illustrated embodiment of the invention, each of the two journal bearings of the shaft $a$ of a grinding roll $b$ comprises a tubular inner race $c$ which is shrunk on to the shaft $a$ and has a roller track for each set of rollers $d$ associated therewith with axial extensions beyond each of the said roller tracks. The two sets of rollers $d$ with their outer races $e$ are mounted and retained within a housing $f$ having a part spherical surface at $g$ carried in a support member $h$ which may be of pedestal or flanged type having a part spherical seating arranged to co-operate with the part spherical surface $g$ of the housing $f$ to allow of relative self-aligning movement in known manner. At the left hand end of the left hand journal bearing, the outwards axial extension of the tubular inner race $c$ which is nearest to the shaft extremity forms a seating on which is mounted a co-axial slidingly adjustable tubular carrier $i$ for the inner race $j$ of a deep groove ball-bearing $k$ whose outer race $m$ is axially trapped in a sleeve member $n$ rigidly fixed to the roller race housing $f$. The said adjustable tubular carrier $i$ has, as shown in FIGURE 4 divided extensions $o$ which are adapted to be clamped on the roll shaft $a$ by screwed studs $s$ after axial adjustment of the grinding roll $b$ relative to the supporting bearing assembly. The grinding roll shaft is thereby positively located in respect of axial movement relative to its bearings.

Although the axial location ball-bearing $k$ is fitted to only one of the two journal bearings of the grinding roll, the extended inner race feature $c$ is applied to both journal bearings, so that the grinding roll may be turned round end for end if required.

The inner races are preferably made in one piece, but may comprise a plurality of tubular parts having outside surfaces which are perfectly co-axial with one another and of identically the same diameter so that when the adjustable tubular carrier $i$ and its clamp $o$ for the axial location ball-bearing $k$ are freed relative to the shaft $a$, each bearing assembly, including the rows of rollers $d$ and the bearing $k$ may be freely slid along the associated inner races on the tubular member $c$ and over the shaft ends. The grinding roll with its shaft ends and the tubular inner races $c$ thereon can be mounted in machining journals with steadies on the surfaces of the inner races $c$ clear of the tracks of the rollers $d$ for the purpose of retruing the said roll.

Figure 1:
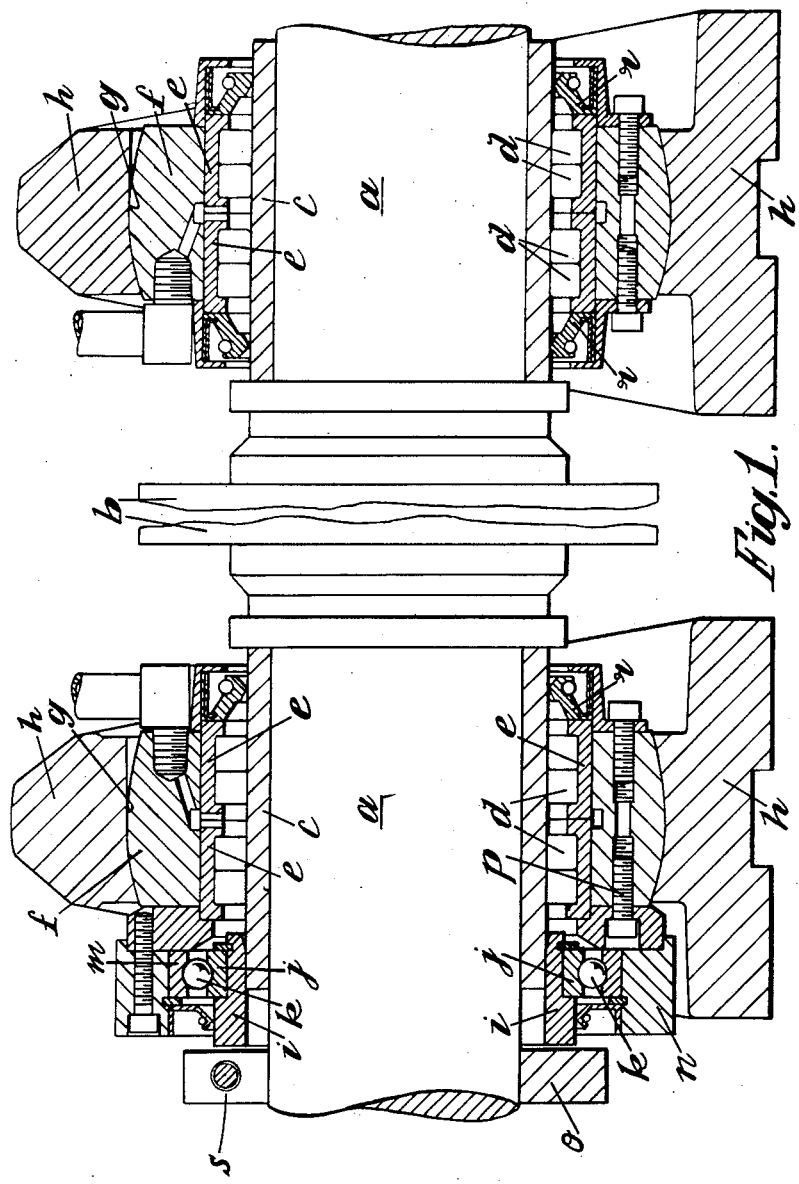
FIGURE 1 is a sectional elevation on the irregular line 1—1 of FIGURE 2 showing the bearings at the opposite ends of a roller shaft constructed in one convenient form in accordance with this invention.
Figure 2:
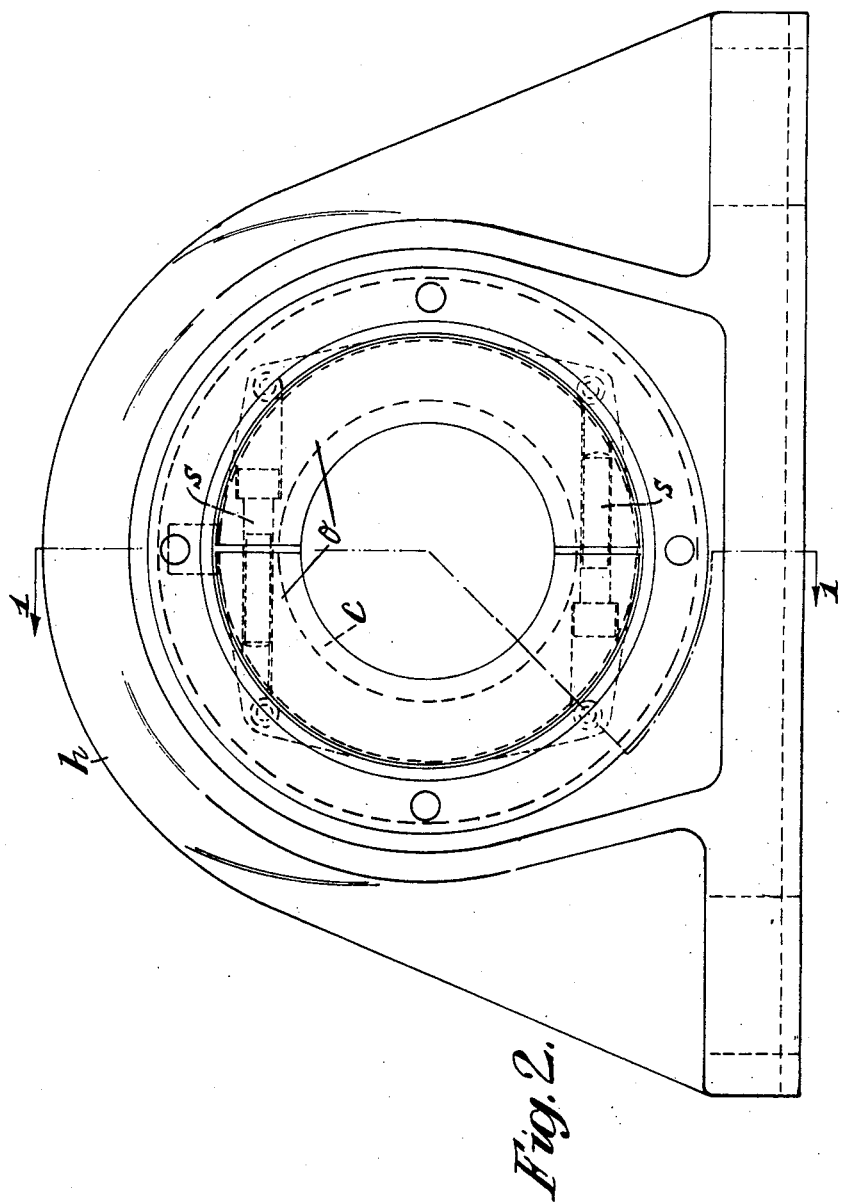
FIGURE 2 is an end elevation looking from left to right of FIGURE 1.

Oil or grease retaining rings R may be provided and these may conveniently be in sealing association with the inner race extensions as shown at the right hand side bearing in FIGURE 1. At the left hand bearing the lubricant will also pass to the location bearing $k$.

What is claimed is:

1. A journal bearing for the grinding roll of a roller mill in which the roller mill shaft is carried at each end in a journal assembly unit, each of which comprises an outer race, two sets of rollers located in each outer race which spaces the sets of rollers apart, a housing having a part spherical-part on the outer surface thereof to house the outer race which is mounted and retained therein, a support member surrounding said housing and providing a spherical seat therefor, an inner race around the roller mill shaft providing tracks for said rollers, the said inner race being axially extended beyond the roller tracks to provide a perfectly co-axial seating surface around the shaft, an axially adjustable tubular carrier around one end of at least one tubular extension, a ball bearing having inner and outer races carried on said tubular carrier, the outer race of said ball bearing being in fixed axial association with the aforesaid assembly unit, the said adjustable tubular carrier being adapted to be fixed to the shaft to locate it and the assembly axially in respect to the grinding roll, so that when such carrier is freed the assembly can be slid off its shaft, and the surfaces of the tubular inner race between and beyond the roller tracks thereon can serve as journal surfaces in a machine tool when the grinding surface of the roll is to be machined.

2. In a journal bearing as claimed in claim 1, the construction of the axially adjustable tubular carrier with a part which surrounds a part of the inner race around the roll shaft and an interconnected divided part which embraces and can be clamped on to the roll shaft.

References Cited in the file of this patent
UNITED STATES PATENTS

| | | |
|---|---|---|
| 1,778,822 | Ackerman | Oct. 21, 1930 |
| 1,781,467 | Madsen | Nov. 11, 1930 |
| 2,052,108 | Okner et al. | Aug. 25, 1936 |
| 2,355,723 | Griffin | Aug. 15, 1944 |